Oct. 23, 1951     E. C. HORTON     2,572,264

WINDSHIELD WASHER

Filed Jan. 24, 1948

INVENTOR
*Erwin C. Horton*
BY
*Bean, Brooks, Buckley & Bean.*
ATTORNEYS

UNITED STATES PATENT OFFICE 2,572,264

WINDSHIELD WASHER

Erwin C. Horton, Hamburg, N. Y., assignor to Trico Products Corporation, Buffalo, N. Y.

Application January 24, 1948, Serial No. 4,133

1 Claim. (Cl. 299—58)

This invention relates to windshield cleaners and primarily to the art of washing or removing vision-obscuring matter from the field of vision by the application of water or other solvent thereto. It has previously been proposed to provide a system automatic in its action for delivering a predetermined volume of solvent onto the windshield in the path of the oscillating wiper for softening congealed matter to facilitate its removal by the wiping blade.

The present invention has for its object to provide a windshield washer in which the liquid solvent is applied in accordance with the manual effort of the user or driver of the vehicle and in a manner which will enable the washer and its associated wiper functioning most efficiently and effectively.

The invention further resides in a windshield washer in which the force of application of the liquid to the windshield surface is controlled to a predetermined degree whereby to obtain the full benefit of the liquid solvent and also to avoid unnecessary waste of the fluid.

Figure 1:
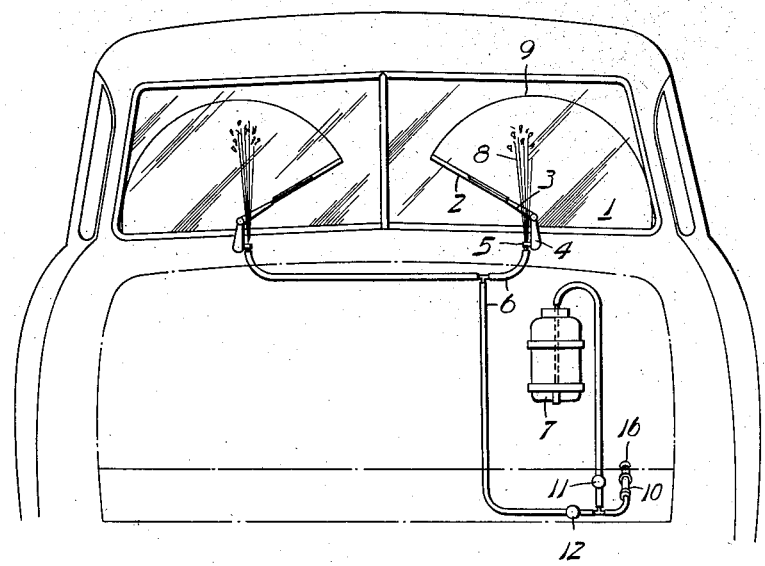
Figure 2:
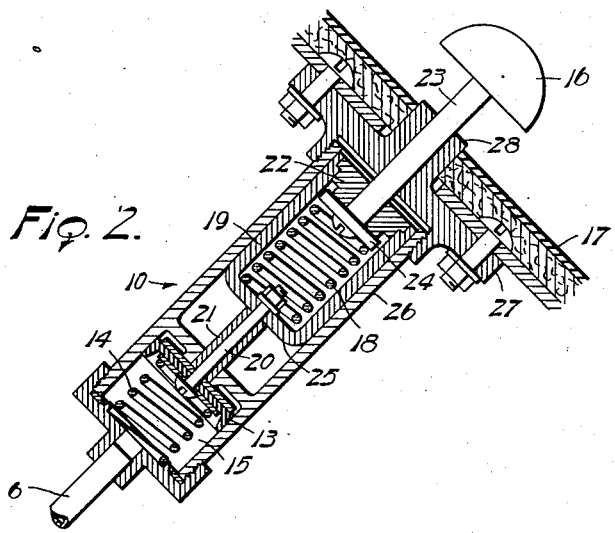

The foregoing and other objects will manifest themselves as the following description progresses, reference being had to the accompanying drawing, wherein Fig. 1 is a front view of a motor vehicle diagrammatically depicting the improved windshield washer; and Fig. 2 is a longitudinal sectional view through the pressure control unit.

Referring more particularly to the drawing, the numeral 1 designates the windshield of a motor vehicle over which the wiping blade 2 is oscillated by an arm 3 suitably journaled on a supporting housing 4 located adjacent the lower edge of the window. On the housing, or some other suitable point, is positioned a nozzle 5 connected by a hose or conduit 6 to a liquid containing reservoir 7, the nozzle having a discharge orifice directed so as to eject a liquid spray, indicated at 8, onto the windshield surface within the path of the blade 2, such path being depicted by the arcuate line 9.

Interposed in the liquid supply line 6 is a pump 10 having an inlet valve 11 and an outlet valve 12. The pump has a plunger 13 retracted by a spring 14, the action being that upon depressing the pump plunger the liquid will be discharged from the pump chamber 15 through the outlet valve 12 and nozzle 5, and upon releasing the pump plunger the spring 14 will retract the latter and intake a fresh charge of liquid from the reservoir 7 through the check valve 11 and into the pump chamber 15. The plunger may be actuated by a handle or knob 16 which may be hand actuated although in the present illustration it is located on the floor 17 of the vehicle so as to be foot depressed. Therefore, by simply depressing the knob or pedal 16, a stream of liquid will be discharged from the nozzle 5 onto the windshield and upon removing the foot pressure the spring 14 will restore the pedal and recharge the pump.

Since this manual operation of the pump is effected by the foot, it is possible to subject the liquid solvent to an excessive pressure, to such an extent that the spray or jet 8 may overshoot the mark and fail to lodge upon the windshield altogether. As a mater of fact, it may be possible to subject the liquid to such a heavy pressure as to cause the nozzle ejected stream to pass up over the top of the vehicle and onto a following vehicle. This might prove even more objectionable if the nozzle orifice is directed to the side of the vehicle. Therefore, it is highly desirable to control the foot pressure in its application to the spray ejecting pump and accordingly there is interposed in the system a power or force absorbing medium capable of absorbing the abnormal pressure for subsequent usage in prolonging the application of the liquid to the windshield. While this medium may be incorporated in the liquid delivery line 6, it is preferably interposed in the transmission between the manually depressed pedal 16 with the result that the excessive foot pressure will be restrained from influencing the pump above a predetermined degree.

To this end there is provided a pressure control unit in the form of a preloaded spring 18 serving as a connecting link or means between the pedal 16 and the pump plunger 13. This yieldable spring connector may be of any desired form. For purposes of illustration a coil spring is enclosed within a confining housing 19 connected at one end by the bolt 20, and its encircling spacer 21, and having its opposite end closed by a removable plug 22 through which the pedal stem or shank 23 slides. The inner end of the shank carries a head 24 on which one end of the spring 18 bears, while the opposite end of the spring exerts pressure upon the opposing wall 25 of the housing 19. In overcoming the pressure of the spring 18, the head 24 may be depressed within the housing. The housing may be suitably guided in an extension 26 of the pump 10, and this extension may be suitably mounted by a bracket 27 to the underside of the floor 17.

As above stated, the spring 18 is preloaded so that for a given pressure the pedal 16 and the pressure control unit 18, 19 will move with the pump plunger 13 as a unit. However, depression of the pedal 16 by a greater force will cause the preloaded spring 18 to yield as the pump plunger continues discharging the liquid solvent at the given or predetermined pressure. It is therefore apparent that under extreme conditions the pedal might be instantaneously depressed to the floor, or until resisted by a stop shoulder 28, but the ejected spray 8 will be delivered at the predetermined pressure and consequently will fall upon the windshield at the desired point for securing the greatest efficiency from the washer. Should the pedal be fully depressed to the floor ahead of the pump plunger, the latter will continue its functioning under the urge of the preloaded spring 18 until the pump stroke has been completed. Upon removal of the foot pressure the pump spring 14 will restore the pedal and its pressure control unit to the normal position shown in Fig. 2 in which the pump chamber 15 has been recharged with an increment of the liquid solvent from the reservoir 7.

The washer is simple in its construction and practical in its operation in that the liquid solvent is discharged instantaneously upon the application of foot pressure. Regardless of the fact that the liquid spray is responsive to manual action, the term manual being employed herein as exclusive of the foot pressure, nevertheless the ejected spray is maintained uniform and the applied pressure is controlled automatically and in a manner to precude manual intervention.

While the foregoing description has been given in detail it is without thought of limitation since the inventive principles involved are capable of assuming other physical embodiments without departing from the spirit and scope of the appended claim.

What is claimed is:

A windshield washer comprising a spray nozzle arranged adjacent a windshield for directing a liquid spray thereonto, pump means connected to the nozzle for supplying the latter with liquid under pressure, said pump means including a liquid displacing member for providing the pressure, a manual actuator for the member, and an energy-storing, pressure-controlling unit interposed between said plunger and said manual actuator for determining the maximum pressure for the liquid to preclude the delivery of an abnormal spray.

ERWIN C. HORTON.

REFERENCES CITED

The following references are of record in the file of this patent:

UNITED STATES PATENTS

| Number | Name | Date |
|---|---|---|
| 408,461 | Capitaine | Aug. 6, 1889 |
| 1,307,243 | Cousins | June 17, 1919 |
| 1,448,508 | Thum | Mar. 13, 1923 |
| 1,595,027 | Sieloff | Aug. 3, 1926 |
| 1,738,790 | Nutt | Dec. 10, 1929 |
| 2,142,056 | Horton | Dec. 28, 1938 |
| 2,145,854 | Bijur | Feb. 7, 1939 |
| 2,153,519 | Horton | Apr. 4, 1939 |
| 2,314,745 | Wesley | Mar. 23, 1943 |